(12) United States Patent
Kluge et al.

(10) Patent No.: US 10,466,350 B2
(45) Date of Patent: *Nov. 5, 2019

(54) TRANSMITTER-RECEIVER CIRCUIT AND METHOD FOR DISTANCE MEASUREMENT BETWEEN A FIRST NODE AND A SECOND NODE OF A RADIO NETWORK

(71) Applicant: Atmel Corporation, San Jose, CA (US)

(72) Inventors: Wolfram Kluge, Dresden (DE); Eric Sachse, Leipzig (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,127

(22) Filed: Jan. 19, 2016

(65) Prior Publication Data

US 2016/0209505 A1    Jul. 21, 2016

Related U.S. Application Data

(63) Continuation of application No. 12/649,133, filed on Dec. 29, 2009, now abandoned.
(Continued)

(30) Foreign Application Priority Data

Dec. 30, 2008  (DE) .................. 10 2008 063 251

(51) Int. Cl.
*G01S 13/84* (2006.01)
*H04W 56/00* (2009.01)
(Continued)

(52) U.S. Cl.
CPC ......... *G01S 13/84* (2013.01); *H04W 56/0065* (2013.01); *H04W 64/006* (2013.01); *H04W 24/10* (2013.01)

(58) Field of Classification Search
USPC ........................................ 455/41.2; 342/458
See application file for complete search history.

(56) References Cited

U.S. PATENT DOCUMENTS 2,529,510 A   11/1950  Manley
3,713,149 A   1/1973   Bruner et al.
(Continued)

FOREIGN PATENT DOCUMENTS

CN   101320090   12/2008
DE   2746776     4/1979
(Continued)

OTHER PUBLICATIONS

Office Action and English translation for German Patent Application dated Jul. 12, 2011, 10 2009 060 591.6.
(Continued)

*Primary Examiner* — Yuwen Pan
*Assistant Examiner* — Erica L Fleming-Hall
(74) *Attorney, Agent, or Firm* — Fish & Richardson P.C.

(57) ABSTRACT

A transmitter-receiver circuit and a method for distance measurement between a first node and a second node of a radio network is provided, wherein a mode of the first node and a mode of the second node are switched from a normal mode for communication in the radio network to a mode for distance measurement, wherein, in the mode for distance measurement for a transit time measurement, a radio signal is transmitted by the first node and received by the second node and a radio signal is transmitted by the second node and received by the first node and a first distance value is determined by measuring the transit time of the radio signals. In the mode for distance measurement, for a phase measurement an unmodulated carrier signal is transmitted as a radio signal by the first node and received by the second node and an unmodulated carrier signal is transmitted as a
(Continued)

radio signal by the second node and received by the first node and a second distance value is determined by measurement and calculation from four values of the phases for different frequencies of the radio signals. Whereby, the distance between the first node and the second node is calculated from the first distance value of the transit time measurement and the second distance value of the phase measurement.

10 Claims, 3 Drawing Sheets

Related U.S. Application Data

(60) Provisional application No. 61/141,508, filed on Dec. 30, 2008.

(51) Int. Cl.
*H04W 64/00* (2009.01)
*H04W 24/10* (2009.01)

(56) References Cited

U.S. PATENT DOCUMENTS

| | | | |
|---|---|---|---|
| 3,725,920 | A | 4/1973 | Kupfer et al. |
| 4,283,726 | A | 8/1981 | Spence et al. |
| 4,757,315 | A | 7/1988 | Lichtenberg et al. |
| 4,804,961 | A | 2/1989 | Hane |
| 5,038,117 | A | 8/1991 | Miller |
| 5,082,364 | A | 1/1992 | Russell |
| 5,220,332 | A | 6/1993 | Beckner et al. |
| 5,723,911 | A | 3/1998 | Glehr |
| 6,067,039 | A | 5/2000 | Pyner et al. |
| 6,108,315 | A | 8/2000 | Freeburg et al. |
| 6,181,944 | B1 | 1/2001 | Uebayashi et al. |
| 6,243,587 | B1 * | 6/2001 | Dent .............. G01S 5/06 342/457 |
| 6,373,434 | B1 | 4/2002 | Hayakawa |
| 6,731,908 | B2 | 5/2004 | Berliner et al. |
| 7,061,369 | B2 | 6/2006 | Bergerhoff |
| 7,209,071 | B1 * | 4/2007 | Boring .............. G01S 13/82 342/118 |
| 8,270,905 | B1 | 9/2012 | Cahill et al. |
| 8,405,543 | B2 | 3/2013 | Kluge et al. |
| 8,644,768 | B2 | 2/2014 | Kluge et al. |
| 8,965,301 | B2 | 2/2015 | Kluge et al. |
| 2002/0094786 | A1 | 7/2002 | Berliner et al. |
| 2003/0090365 | A1 | 5/2003 | Bergerhoff |
| 2005/0190098 | A1 | 9/2005 | Bridgelall et al. |
| 2005/0237953 | A1 * | 10/2005 | Carrender .............. G01S 13/84 370/278 |
| 2006/0083406 | A1 * | 4/2006 | Ishimura .............. B60R 25/24 382/106 |
| 2006/0116837 | A1 * | 6/2006 | Hager .............. G08B 29/20 702/95 |
| 2007/0002932 | A1 | 1/2007 | Shirai et al. |
| 2008/0116877 | A1 | 5/2008 | Giubbini et al. |
| 2008/0186224 | A1 * | 8/2008 | Ichiyanagi .............. G01S 13/347 342/109 |
| 2008/0291089 | A1 * | 11/2008 | Seong .............. G01S 5/06 342/387 |
| 2009/0017782 | A1 * | 1/2009 | Monat .............. G01S 7/285 455/130 |
| 2010/0103020 | A1 * | 4/2010 | Wu .............. G01S 13/4454 342/28 |
| 2010/0013711 | A1 | 6/2010 | Bartlett |
| 2010/0165866 | A1 | 7/2010 | Sachse et al. |
| 2010/0167661 | A1 | 7/2010 | Kluge et al. |
| 2010/0167662 | A1 | 7/2010 | Kluge et al. |
| 2010/0207820 | A1 | 8/2010 | Kawano et al. |
| 2010/0321245 | A1 | 12/2010 | Aoki |
| 2011/0006942 | A1 | 1/2011 | Kluge et al. |
| 2011/0187600 | A1 | 8/2011 | Landt |
| 2012/0176227 | A1 | 7/2012 | Nikitin |
| 2013/0155887 | A1 | 6/2013 | Sachse et al. |

FOREIGN PATENT DOCUMENTS

| | | |
|---|---|---|
| DE | 10161507 | 7/2003 |
| DE | 102004042231 | 3/2006 |
| WO | WO 2002/01247 | 1/2002 |

OTHER PUBLICATIONS

Office Action for Chinese Patent Application 200910262544.4, dated Dec. 31, 2011, 14 pages.

Hsieh et al., "Phase-Locked Loop Techniques—A Survey", IEEE Transactions on Industrial Electronics, Dec. 1996, 43(6):609-615.

* cited by examiner

TRANSMITTER-RECEIVER CIRCUIT AND METHOD FOR DISTANCE MEASUREMENT BETWEEN A FIRST NODE AND A SECOND NODE OF A RADIO NETWORK

This application is a continuation of U.S. patent application Ser. No. 12/649,133, filed Dec. 29, 2009, which is claims priority to German Patent Application No. DE 10 2008 063 251.1, which was filed in Germany on Dec. 30, 2008, and to U.S. Provisional No. 61/141,508, which was filed on Dec. 30, 2008, the contents of each of which are herein incorporated by reference.

BACKGROUND OF THE INVENTION

Field of the Invention

The present invention relates to a transmitter-receiver circuit and a method for distance measurement between a first node and a second node of a radio network.

Description of the Background Art

International Pat. Appl. No. WO 02/01247 A2, which corresponds to U.S. Publication No. 2003090365 discloses a method for measuring the distance between two objects with the use of electromagnetic waves. An interrogation signal of a base station and a response signal of a portable code emitter are transmitted twice at different carrier frequencies. The carrier frequencies in this case are correlated; i.e., they are dependent on one another. The carrier frequencies are approximated to one another, so that a phase shift between the signals can be measured. The distance of the code emitter to the base station is calculated from this phase shift. The interrogation signal and the response signal can be transmitted at different carrier frequencies or at the same carrier frequencies. The carrier frequencies are altered for a renewed interrogation/response dialog.

U.S. Pat. No. 6,731,908 B2 discloses a method for determining the distance between two objects for Bluetooth technology. In this case, the frequency is changed by frequency hops to measure a phase offset for multiple different frequencies. An object has a voltage-controlled crystal oscillator in a phase-locked loop (PLL), whereby the phase-locked loop is closed during the receiving and opened during the transmission, so that the receive signal and transmit signal have the same frequency. The phase of the local oscillator signal of the voltage-controlled crystal oscillator due to the synchronization by the PLL is thereby coherent to the received signal.

U.S. Pat. No. 5,220,332 discloses a distance measuring system which has an interrogator and a transponder and enables the nonsimultaneous measurement between two objects. A carrier signal is modulated with a (low-frequency) modulation signal with a variable modulation frequency to determine by a phase measurement or alternatively by a transit time measurement a distance between the interrogator and the transponder from the change in the modulation signal.

SUMMARY OF THE INVENTION

It is therefore an object of the present invention to improve a method for distance measurement between two nodes of a radio network. Accordingly, a method for distance measurement between a first node and a second node of a radio network is provided.

In the method, a mode of the first node and a mode of the second node are switched from a normal mode for communication in the radio network to a mode for distance measurement, particularly by means of agreement between the nodes.

In the mode for distance measurement, for a transit time measurement a radio signal is transmitted by the first node (active) and received by the second node and advantageously evaluated. Further, for the transit time measurement a radio signal is transmitted by the second node (active) and received by the first node. For the distance measurement, a first distance value is determined by measuring the transit time of the transmitted radio signals. The first distance value in this case is preferably proportional to a measured transit time of the radio signals.

At the same time or beforehand or afterwards, in the mode for distance measurement, for a phase measurement a first unmodulated carrier signal is transmitted as a radio signal by the first node (active) and received by the second node and advantageously evaluated. Further, for the phase measurement, a second unmodulated carrier signal is transmitted as a radio signal by the second node (active) and received by the first node. An unmodulated carrier signal is, for example, a high-frequency sinusoidal oscillation.

A first value and a second value of a first phase are measured by the first node. The measurements in this case are made preferably in the intermediate frequency domain. The first value of the first phase is assigned to a first frequency of the received second carrier signal and the second value of the first phase is assigned to a second frequency of the received second carrier signal. The first frequency and the second frequency have a frequency difference. The frequency difference in this regard is sufficiently large to measure phase differences, based on this frequency difference. Preferably, the frequency difference is defined by a frequency spacing of channels in the radio network.

A third value and a fourth value of a second phase are measured by the second node. The measurements in this case are made preferably in the intermediate frequency domain. The third value of the second phase is assigned to a third frequency of the received first carrier signal and the fourth value of the second phase is assigned to a fourth frequency of the received first carrier signal. The third frequency and the fourth frequency also have the frequency difference. It is in fact possible that the first frequency and the third frequency are different; it is likewise possible that the second and the fourth frequency are different, but preferably the first and third frequency are the same and preferably also the second and fourth frequency are the same. In the case of different frequencies, the first frequency and the third frequency differ, for example, by one or more frequency spacings of channels (channel spacings) of the radio network.

A second distance value is determined from the first value and the second value of the first phase and from the third value and the fourth value of the second phase and advantageously from the frequency difference. The second distance value is therefore preferably proportional to one or more of the measured phase differences of the radio signals.

The distance between the first node and the second node is calculated from the first distance value of the transit time measurement and the second distance value of the phase measurement as input values for the calculation. In this regard, use is preferably made of the fact that the distance value of the phase measurement is proportional to a ratio of the phase difference to the frequency difference. For the calculation, the first distance value of the transit time measurement and the second distance value of the phase measurement are preferably evaluated combined in the normal mode.

The invention has as its object, further, to provide a transmitter/receiver circuit, as improved as possible, of a radio network node.

Accordingly, a transmitter/receiver circuit of a radio network node is provided. The transmitter/receiver circuit has an arithmetic unit. The arithmetic unit is set up to shift from a normal mode for communication in the radio network to a mode for distance measurement with agreement with another node of the radio network.

The arithmetic unit is set up further in the mode for distance measurement to determine a first distance value by a transit time measurement by means of a sent radio signal and another received radio signal, transmitted by the other node. The sent radio signal and the additional radio signal received by the other node are different in this case. To this end, the radio signal is preferably transmitted by a transmitter circuit of the transmitter/receiver circuit over an antenna for reception by another node. Preferably, a receiver circuit of the transmitter/receiver circuit receives the additional radio signal sent by the other node.

The arithmetic unit is set up in the mode for distance measurement to determine a second distance value from a first value and a second value of a first measured phase and from a third value and a fourth value of a second phase. The first value is assigned to a first frequency and the second value is assigned to a second frequency of a first unmodulated carrier signal. The first frequency and the second frequency have a frequency difference.

The third value is assigned to a third frequency and the fourth value is assigned to a fourth frequency of a second unmodulated carrier signal. The third frequency and the fourth frequency also have the frequency difference. The frequency difference in this regard is sufficiently large to measure phase differences, based on this frequency difference. Preferably, the frequency difference is defined by a frequency spacing of channels in the radio network.

The values of the phases in this regard are preferably measured in the nodes of the radio network. The transmitter/receiver circuit is preferably formed to measure at least two phase values.

The arithmetic unit is set up further in the mode for distance measurement to determine a second distance value by a phase measurement by means of a sent radio signal and another received radio signal. The sent radio signal and the received additional radio signal are different in this case. Preferably, to this end, the arithmetic unit controls the transmitter circuit for transmitting the radio signal with at least two different frequencies.

The arithmetic unit is set up further to calculate a distance to another node of the radio network from the first distance value of the transit time measurement and the second distance value of the phase measurement. For this purpose, the arithmetic unit is set up for the combined evaluation of the first distance value and of the second distance value.

Because of the ambiguity of the phase measurement, the second distance value is also ambiguous. If, for example, 360° covers a distance range of 100 meters, the second distance value of, for example, 12 meters, 112 meters, 212 meters, etc., (ambiguous) can be determined by means of the phase measurement.

Multiple phase measurements can be carried out one after another, for example, to average the second distance value. Multiple first distance values from multiple transit time measurements can also be taken into account.

Another aspect of the invention is a system which has a first node and a second node of a radio network and is set up to carry out the previously explained method.

The embodiments described hereinafter relate both to the transmitter/receiver circuit and to the method. The functions of the transmitter/receiver circuit in this case emerge from the method features.

According to an embodiment, an ambiguity of the second distance value of the phase measurement is resolved by evaluating the first distance value of the transit time measurement. To this end, the distance is determined preferably by calculating a minimum distance between the first distance value and the second distance value.

It is provided in another embodiment that in the normal mode the results of the phase measurement and/or the transit time measurement are transmitted from the second node to the first node.

Advantageously, the mode for distance measurement has a first part for the transit time measurement and a second part for the phase measurement. Preferably, the first node and the second node are coordinated in regard to the transition between the first part for transit time measurement and the second part for phase measurement. Preferably, in the mode for distance measurement, the first node and/or second node perform distance-measurement-specific functions that are deactivated in the normal mode.

According to an embodiment, a command for distance measurement, particularly a command for starting the mode for distance measurement, with the address of the second node is transmitted from the first node to the second node. The command for distance measurement in the normal mode is preferably transmitted in the useful data of a frame from the first node to the second node.

The transmitter/receiver circuit can be set up to transmit a command for distance measurement with a target address for the second node. For this purpose, the hardware functions and software functions corresponding to the command are implemented in the circuit. The circuit preferably has the function of address coding, so that non-addressed nodes discard commands for distance measurement.

In an embodiment, it is provided that a frame for synchronizing a starting time for the distance measurement is transmitted from the second node to the first node. A first process run in the first node and a second process run in the second node are coordinated in time with respect to one another by this synchronization. The time coordination in this case can occur separately for the transit time measurement and the phase measurement.

According to another embodiment, it is provided that a command for distance measurement is transmitted by the first node and received by the second node. The mode for distance measurement of the second node is started by the receipt of the command for distance measurement. Especially preferably, the transmission and reception of the command as a radio signal for distance measurement is used at the same time for transit time measurement. To this end, preferably the time for transmitting the command from the first node to the second node is measured.

It is provided according to an embodiment that measurement results of the distance measurement are transmitted from the second node to the first node. The transmission of the measurement results occurs after the completion of the distance measurement preferably by means of useful data of a standard-compliant frame. The distance is then calculated in the first node.

Parameters for the phase measurement and/or the transit time measurement can also be transmitted with the command for distance measurement. For example, a sequence of frequencies for the phase measurement and/or a time period for one or more steps of the distance measurement are transmitted to the second node with the command for distance measurement. The transmission occurs advantageously with the useful data of a frame transmitted in a standard-compliant manner.

An embodiment provides that a time synchronization of the measurements of the values is performed. The time synchronization in this regard is performed in such a way that measurement times of the measurements of the values, therefore, of the first, second, third, and fourth value, have a predefined temporal relationship to one another.

Further, a first time interval and a second time interval can be the same. Preferably, the first time interval between a first measurement time of the first value of the first phase and a second measurement time of the second value of the first phase is defined. The second time interval is preferably defined between a third measurement time of the third value of the second phase and a fourth measurement time of the fourth value of the second phase. This temporal relationship has the effect that a third time interval as well between the first measurement time and the third measurement time is the same as a fourth time interval between the second measurement time and the fourth measurement time.

The time intervals can be predefined. The time intervals are therefore not determined initially from the ongoing measurement. Preferably, the time intervals are fixedly predefined, for example, implemented as a set of parameters. Alternatively, the time intervals for a distance measurement as well can be agreed upon between the nodes. To this end, the nodes are set up accordingly. Advantageously, a respective circuit of nodes is set up to measure the values of phases at the time intervals by storing the phase value current at the measurement time, the values of the phases being determined continuously. Alternatively, the nodes are set up to measure the values of the phase only at the measurement time. The measured value of the phase is stored.

In an embodiment, to determine the distance a phase difference is calculated from the first value and the second value of the first phase and from the third value and fourth value of the second phase. The calculation can be performed using the formula:

$$\Delta\varphi = (\varphi_{A2} - \varphi_{B2}) - (\varphi_{A1} - \varphi_{B1})$$

Here, the formula also comprises all algebraic transformations of its terms. In the formula, $\varphi_{A1}$ is the first value and $\varphi_{A2}$ is the second value of the first phase. $\varphi_{B1}$ is the third value and $\varphi_{B2}$ is the fourth value of the second phase.

The previously described embodiments are especially advantageous both individually and in combination. In this regard, all refinement variants can be combined with one another. Some possible combinations are explained in the description of the exemplary embodiments shown in the figures. These possible combinations of the refinement variants, depicted therein, are not definitive, however.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Distance measurements in a radio network with multiple nodes can be based on phase measurements. In this case, for example, an unmodulated carrier signal with the frequency f1 and an unmodulated carrier signal with the frequency f2 are transmitted one after another. The frequencies differ only in a small difference frequency $\Delta f$. In the receiver, the phase of the received wave is compared with the phase of the transmitted wave and stored as measured values $\varphi 1$ and $\varphi 2$. The distance d between the stations can be calculated from this:

$$d = \frac{(\varphi 2 - \varphi 1)c}{2\pi \Delta f} \qquad (1)$$

Here, c is the speed of light.

The phase measurement is always modulo ($2\pi$). Because of the periodicity, an ambiguity arises for the phase measurement with multiples of $c/\Delta f$. The ambiguity can be resolved by measuring with another frequency f3, whereby the additional difference frequency f3−f2 must be different from the difference frequency f2−f1. A prerequisite for this is that the radio channel in the radio network behaves as a delay element. A radio channel with multipath propagation does not meet this condition, so that resolution of the ambiguity is at least made difficult. The range of the distance measurement for the 0° to 360° phase value in this case depends on the difference frequency f2−f1.

In a present exemplary embodiment, which is explained with reference to the figures, a system for a radio network is provided in which a phase measurement is combined with a transit time measurement in a distance measuring system of a radio network. The distance measuring system is implemented in a radio network according to the industry standard IEEE 802.15.4, whereby a mode is changed from a normal mode for communication in the radio network to a mode for distance measurement. In this case, the exemplary embodiment is based on the idea that for the transit time measurement only a coarse resolution is needed to eliminate the ambiguity of the finer-resolution phase measurement implementable in the industry standard IEEE 802.15.4. Furthermore, only a small modification of the nodes is necessary for distance measurement, so that the distance measurement can be implemented in an especially simple manner.

Figure 1:
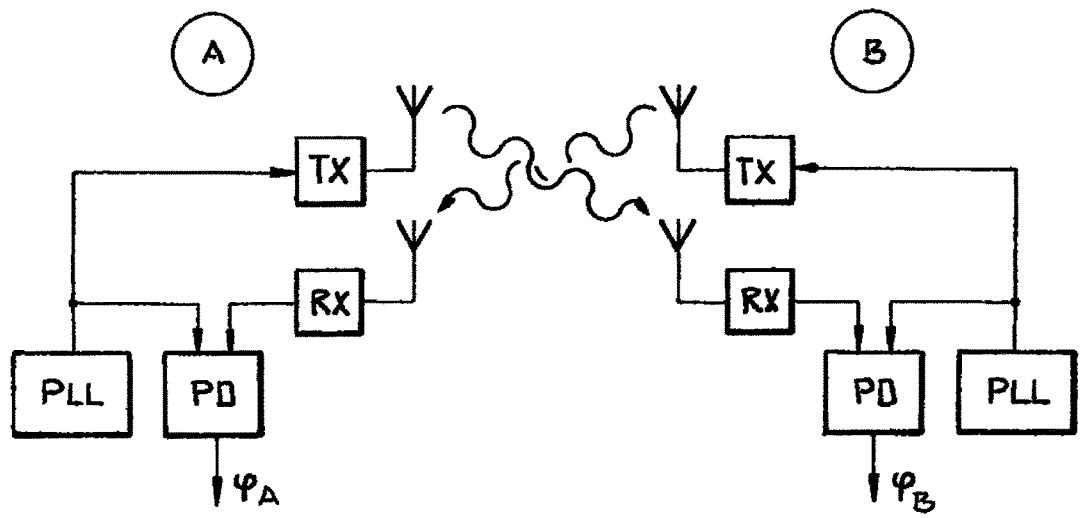
FIG. 1 shows a schematic view of a system for phase measurement.

The distance measuring system is set up for a phase measurement with a difference frequency of 1 MHz and achieves a measurement range of 150 m and accordingly multiples thereof. FIG. 1 shows schematically a system for phase measurement. In this case, the distance is to be measured between a node A and a node B of a radio network according to the industry standard IEEE 802.15.4. FIG. 1, by way of example, shows the functional groups in nodes A, B, said groups which are active in the mode for distance measurement. The transceiver of node A has a phase-locked loop PLL for generating a first carrier signal, which is transmitted by transmitting circuit TX. The first carrier signal is received by the receiving circuit RX of the transceiver of node B. The transceiver of node B also has a phase-locked loop PLL, so that the phase of the received carrier signal with the phase of the PLL can be subtracted in a phase detector circuit PD, so that the phase TB is obtained.

FIG. 1 is used here only for the basic explanation of the phase measurement. For a simple realization, the phase is evaluated preferably by an intermediate frequency signal generated by downmixing. The transceiver of node B as well has a transmitting circuit TX, which transmits a radio signal to the receiving circuit RX of the transceiver of node A. The transceiver of node A also has a phase detector circuit PD for evaluating phase TA. Both phases TA and TB are evaluated to calculate the distance. Instead of the shown two antennas per node, preferably only one antenna and one switch are used for switching between transmission and reception. If a half-duplex system is used, the transceivers of nodes A and B cannot send and receive simultaneously. For a half-duplex system, the transceivers of nodes A and B therefore transmit in different time slots. The phase measurement of the phases TA and TB is explained in greater detail in the description for FIGS. 3 and 4.

Figure 2:
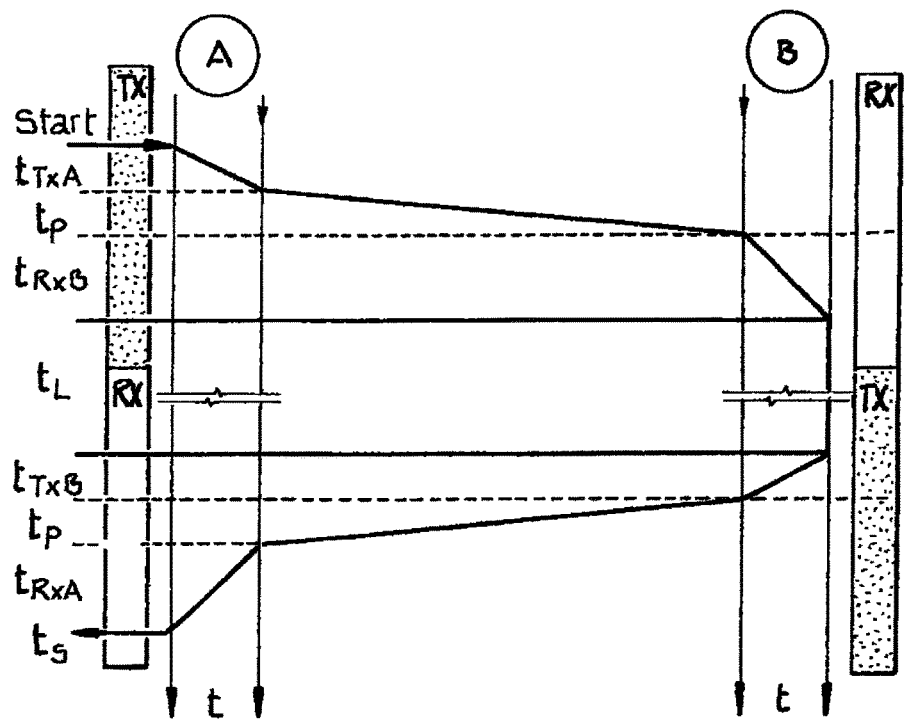
FIG. 2 shows a schematic diagram for the transit time measurement.

The transit time measurement occurs with an accuracy of 125 ns (8 MHz clock frequency), so that a distance resolution of +/−37.5 m can be achieved. In so doing, errors arise in both involved transceivers of nodes A and B. FIG. 2 shows schematically a diagram for transit time measurement. The transceiver of node A begins the measurement and transmits a frame. A counter is started at the same time. The transceiver of node B receives the frame and obtains a time (time stamp) based on the transmitted signal. Based on this time, a response frame is transmitted with a constant delay tL. The transceiver of node A determines a time using the same method and stops the time measurement. The transit time is calculated as follows:

$$t_P = \frac{1}{2}(t_S - t_{TxA} - t_{RxA} - t_{TxB} - t_{RxB} - t_L) \quad (2)$$

The times (tL—time between reception and transmission in the transceiver of node B, tTxA—time from the start of the timer to the transmission of the signal to the antenna of the transceiver of node A, tRxB—time from the receiving of the signal with the antenna of the transceiver of node B to the detection of the signal, tTxB—time from the transmit command to the transmission of the signal to the antenna of the transceiver of node B, and tRxA—time from the receiving of the signal with the antenna of the transceiver of node A to the detection of the signal) are known from the layout of the transceiver circuit and/or from the configuration. For example, the time tRxB, tL, and tTxB can be determined by the transceiver of node B in a mode for distance measurement and communicated to the transceiver of node A by means of a data transmission in the normal mode. The distance is then calculated using:

$$d = t_P * c \quad (3)$$

The ambiguity of the phase measurement is eliminated with this calculation. Because the transit time measurement is also nonproblematic up to 200 µs, the top limit of the detectable range can be shifted to over 30 km. Ranges greater than 30 km must not be supported, because then in addition the Earth's curvature provides further dampening of the radio signal.

Figure 3:
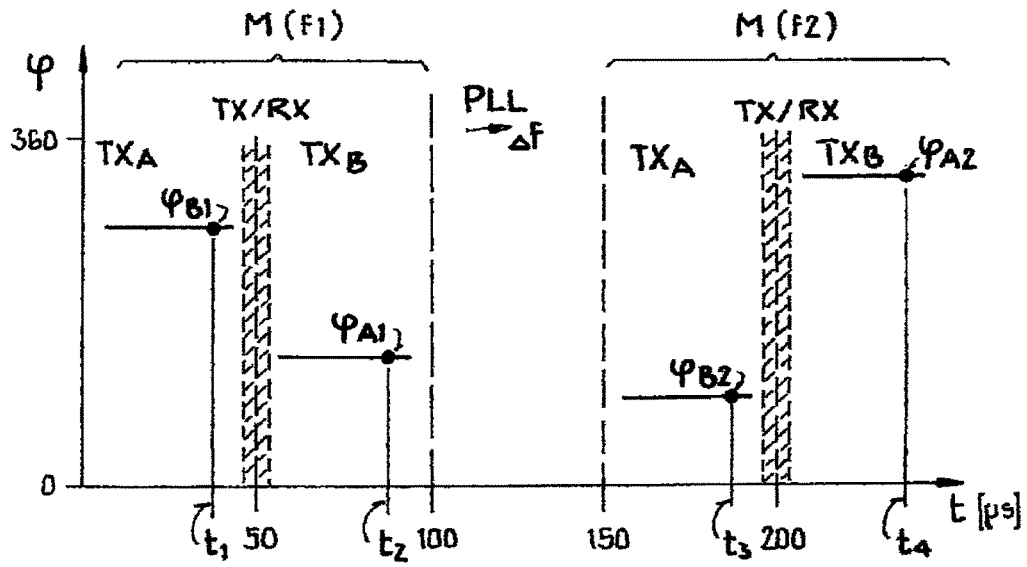
FIG. 3 shows a first schematic diagram with phase measurements of two nodes of a radio network.
Figure 4:
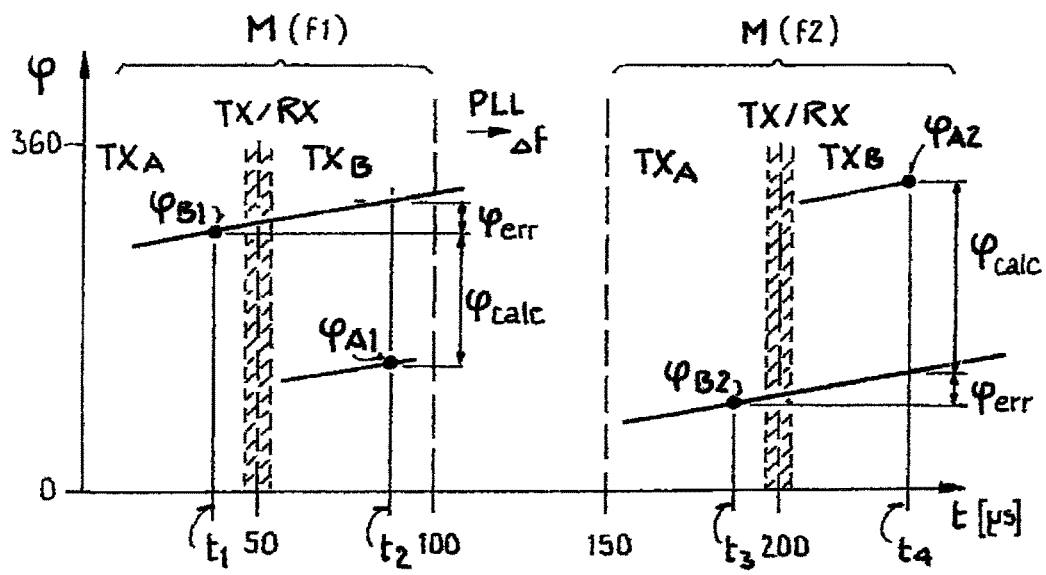
FIG. 4 shows a second schematic diagram with phase measurements of two nodes of a radio network.

A diagram for a measurement process for phase measurement is shown schematically in FIG. 3. In the method for distance measurement between the first node A and the second node B, a first unmodulated carrier signal with a carrier frequency f1 is transmitted by the first node A and received by the second node B. A second unmodulated carrier signal with the carrier frequency f1 is transmitted by the second node B and received by the first node A. The carrier frequency f1 in the exemplary embodiment of FIG. 3 is the same for both transmission directions.

A first value φA1 of a first phase is measured at a first measurement time t2 by the first node A. A third value φB1 of a second phase is measured at a third measurement time t1 by the second node B.

This is followed by an increase in the carrier frequency by a frequency difference Δf to the increased carrier frequency f2. Alternatively, a reduction of the carrier frequency by the frequency difference Δf would also be possible. The first unmodulated carrier signal is transmitted with the increased carrier frequency f2 by the first node A and received by the second node B. The second unmodulated carrier signal is transmitted with the increased carrier frequency f2 by the second node B and received by the first node A. The increased carrier frequency f2 as well in the exemplary embodiment of FIG. 3 is the same for both transmission directions.

After the increase in the carrier frequency, a second value φA2 of the first phase is measured at a second measurement time t4 by the first node A. A fourth value φB2 of a second phase is measured at a fourth measurement time t3 by the second node B. In an intermediate phase in each case, which is shown as shaded in FIGS. 3 and 4, the first node A and the second node B switch between transmitting TX and receiving RX.

In the rather theoretical case of FIG. 3, there is no frequency offset between the frequencies of the first reference clock generator for clocking the phase-locked loop PLL of the first node A and of the second reference clock generator for clocking the phase-locked loop PLL of the second node B. FIG. 3 is intended first to represent the rather theoretical case that the frequencies of the reference clock generators clocking the phase-locked loop PLL are exactly the same. The measured phase φ is therefore constant during the time t.

In the exemplary embodiment of FIG. 3, the first node A transmits first and the third value φB1 of the second phase is measured at the third time t1 in the second node B. Then, the second node B transmits and the first value φA1 of the first phase is measured at the first time t2 in the first node A. Between the phase measurements M(f1), the nodes A, B switch between transmission and reception TX/RX. In the case of FIG. 3, both measurements are made at the frequency f1.

The carrier frequency is then increased by the same frequency difference Δf in both circuits of the nodes A, B. The phase-locked loops PLL require, for example, 50 has or less to settle. Both phase measurements M(f2) are then repeated at times t3 and t4 for the frequency f2, whereby the second phase value φA2 of the first phase is determined in the first node A and the fourth phase value φB2 of the second phase in the second node B. Thus, the first value φA1 of the first phase and the third value φB1 of the second phase are assigned to the same carrier frequency f1. Likewise, the second value φA2 of the first phase and the fourth value φB2 of the second phase are assigned to the same increased carrier frequency f2.

A phase difference Δφ can be calculated from the phase values φA1, φB1, φA2, and φB2 as follows:

$$\Delta\varphi = (\varphi_{A2} - \varphi_{B2}) - (\varphi_{A1} - \varphi_{B1}) \quad (4a)$$

By transformation, one obtains:

$$\Delta\varphi = (\varphi_{A2} - \varphi_{A1}) - (\varphi_{B2} - \varphi_{B1}) \quad (4b)$$

Thus, the distance d can be calculated as follows:

$$-d = \frac{\Delta\varphi c}{\pi \Delta f} \quad (5)$$

whereby the distance value is not unambiguous because of the periodicity. In a departure from the rather theoretical presentation in FIG. 3, in reality nodes A, B will have reference clock generators for clocking the phase-locked loop PLL, whose frequencies have a frequency offset, for example, because of fabrication tolerances or different temperatures. As a result, the phase φ in the specific receiving node changes, as is shown schematically by the slopes of the phase profiles in FIG. 4.

The phase change in the measurement M(f1) between the measurement times t1 and t2 causes a phase error φerr at a specific phase φcalc. The same phase error φerr arises in the measurement M(f2) at measurement times t3 and t4, when a time interval between the phase measurement M(f1), M(f2) is sufficiently small. If the time intervals t2−t1 and t4−t3 or the time intervals t3−t1 and t4−t2 are the same, the phase error φerr is also the same and drops out during the calculation of the phase difference Δφ (see Equation (4a/4b)). As a result, the distance measurement can also be used based on the phase measurement, when the reference clock generators for the clocking of the phase-locked loop PLL of both nodes A, B are unsynchronized, as in the exemplary embodiment of FIG. 1.

Figure 5:
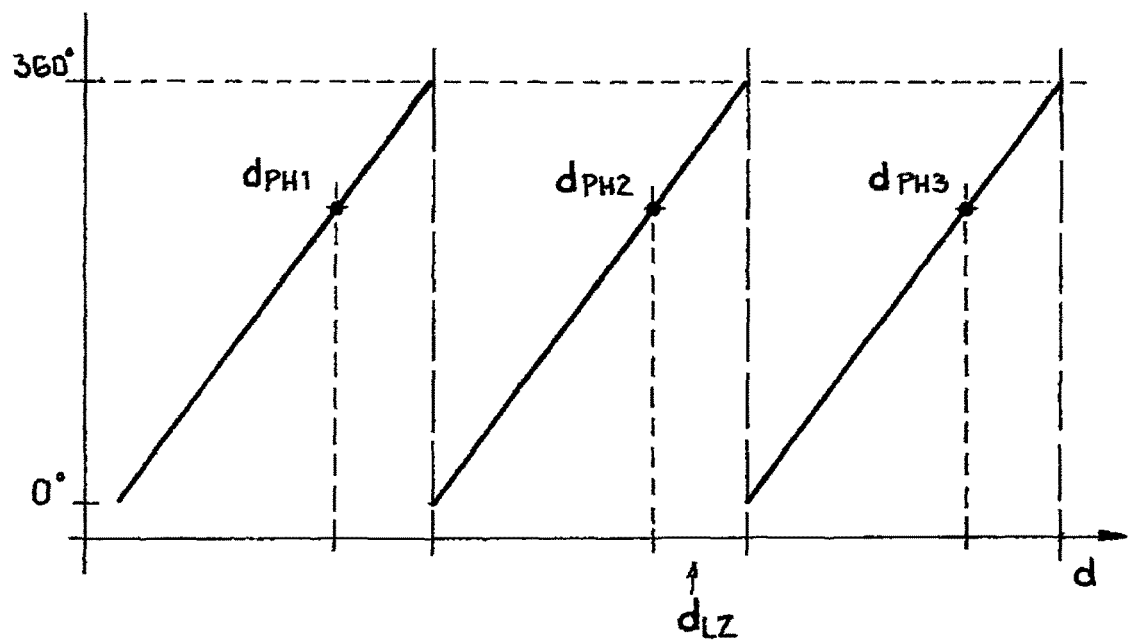
FIG. 5 shows a schematic diagram for the distance measurement.

FIG. 5 shows a schematic diagram for an example of a combined evaluation of a phase measurement and a transit time measurement in a radio network. The measurement result of the phase measurement is plotted versus the distance d. In this case, the signal repeats periodically every 360°. Because of the ambiguity, a determined phase can represent three distances dPH1, dPH2, and dPH3, drawn by way of example. In addition, the measurement result dLZ of the distance measurement is evaluated, which because of the low resolution deviates from the distance dPH2 determined by the phase measurement. An evaluation algorithm assigns the measurement result dLZ of the transit time measurement to one of the measurement results dPH1, dPH2, or dPH3 of the phase measurement. For example, the measurement result dPH1, dPH2, or dPH3 of the phase measurement is selected that has the smallest distance to the measurement result dLZ of the transit time. It is also possible to assign the measurement result dLZ of the transit time to a modulo of the phase measurement. In the exemplary embodiment of FIG. 5, the same result would be achieved in both cases: The distance is dPH2.

The advantage is achieved by the exemplary embodiments explained in FIGS. 1 to 5 that the system for distance measurement in the network is not limited to a maximum distance because of the modulo effect. Under favorable conditions, a distance measurement for a network node with large range can be achieved. For example, distances for network nodes with an elevated location or with a power amplifier (PA) as well can be determined. In addition, the surprising effect is achieved that a good resolution can be used with the phase measurement and at the same time the good resolution of the phase measurement can also be used for greater distances with the transit time measurement.

The invention is not limited to the shown embodiment variants in FIGS. 1 through 5. The functionality of the system of a radio network is advantageously used for a radio system according to the industry standard IEEE 802.15.4 or according to the industry standard IEEE 802.15.1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for distance measurement between nodes of a radio network, the method comprising:
   transmitting, by a first node of the radio network, a first carrier signal having a first frequency;
   receiving, by the first node, a second carrier signal having the first frequency;
   measuring, by the first node, a first phase value of the second carrier signal;
   transmitting, by the first node, a third carrier signal having a second frequency that is higher or lower than the first frequency;
   receiving, by the first node, a fourth carrier signal having the second frequency;
   measuring, by the first node, a second phase value of the fourth carrier signal;
   receiving, by the first node, a third phase value of the first carrier signal measured by a second node of the radio network and a fourth phase value of the third carrier signal measured by the second node;
   calculating, by the first node, a phase difference using the first, second, third and fourth phase values; and
   calculating, by the first node, a first distance between the first and second nodes using the phase difference.

2. The method according to claim 1, wherein the first and second carrier signals are unmodulated.

3. The method according to claim 1, further comprising:
   prior to receiving the third phase value and the fourth phase value calculated by the second node, switching a mode of the first node from a distance measurement mode to a radio communication mode.

4. The method according to claim 1, further comprising:
   transmitting, by the first node, a first radio signal;
   receiving, by the first node, a second radio signal; and
   calculating, by the first node, a second distance using transit times of the first and second radio signals;
   comparing, by the first node, the second distance and a plurality of distances including the first distance; and
   responsive to the comparing, assigning the second distance to one of the plurality of distances.

5. A circuit of a first node of a radio network, the circuit comprising:
   a wireless transceiver configured to:
      transmit a first carrier signal having a first frequency;
      receive a second carrier signal having the first frequency;
      transmit a third carrier signal having a second frequency that is higher or lower than the first frequency;

receive a fourth carrier signal having the second frequency;

a phase detector configured to:

measure a first set of phase values of the second and fourth carrier signals;

calculate a phase difference using the first set of phase values and a second set of phase values of the first and third carrier signals measured at a second node of the radio network; and a measurement circuit configured to:

calculate a first distance between the first and second nodes using the phase difference.

6. A system of a radio network which has a first node and a second node and is configured to carry out the method according to claim 1.

7. The method of claim 1, further comprising:

transmitting, by the first node, a first radio signal;

receiving, by the first node, a second radio signal;

calculating, by the first node, a second distance using transit times of the first and second radio signals; and assigning, by the first node, the second distance to a modulo of the phase difference.

8. The circuit according to claim 5, wherein the first and second carrier signals are unmodulated.

9. The circuit according to claim 5, further comprising:

prior to receiving the second set of phase values measured by the second node, switching a mode of the node from a distance measurement mode to a radio communication mode.

10. The circuit according to claim 5, further comprising:

transmitting a first radio signal;

receiving a second radio signal;

calculating a second distance using transit times of the first and second radio signals; and assigning the second distance to a modulo of the phase difference.

* * * * *